United States Patent
Phillips, III

(10) Patent No.: US 7,089,150 B2
(45) Date of Patent: Aug. 8, 2006

(54) GYRO BASED ALIGNMENT SYSTEM

(76) Inventor: Robert B. Phillips, III, 17 N. Cross Rd., Staatsburg, NY (US) 12580

( * ) Notice: Subject to any disclaimer, the term of this patent is extended or adjusted under 35 U.S.C. 154(b) by 0 days.

(21) Appl. No.: 10/947,937

(22) Filed: Sep. 23, 2004

(65) Prior Publication Data

US 2006/0064275 A1   Mar. 23, 2006

(51) Int. Cl.
*G01C 9/00*  (2006.01)
*G01C 19/00*  (2006.01)

(52) U.S. Cl. .................................................. 702/154
(58) Field of Classification Search ................. 702/154
See application file for complete search history.

(56) References Cited

U.S. PATENT DOCUMENTS

| | | |
|---|---|---|
| 3,962,796 A | 6/1976 | Johnston |
| 4,330,945 A | 5/1982 | Eck |
| 4,457,075 A | 7/1984 | Murata |
| 4,466,196 A | 8/1984 | Woodruff |
| 4,578,870 A | 4/1986 | Cooke |
| 5,048,954 A | 9/1991 | Madey et al. |
| 5,218,770 A | 6/1993 | Toga |
| 5,274,433 A | 12/1993 | Madey et al. |
| 5,600,893 A | 2/1997 | Phillips |
| 5,619,323 A * | 4/1997 | Hamilton et al. ...... 356/139.03 |
| 5,760,938 A | 6/1998 | Hodge |
| 5,864,956 A | 2/1999 | Dong |
| 5,907,907 A | 6/1999 | Ohtomo et al. |
| 6,065,217 A | 5/2000 | Dong |
| 6,082,011 A | 7/2000 | Phillips |
| 2004/0227934 A1 | 11/2004 | Strege |

OTHER PUBLICATIONS

Instruction Manual for "Laser Toe Gauge," by Advanced Racing Technology Inc., (May 2004), pp. 1-2.
Instruction Manual for "Tuning—Chassis Setup and Wheel Alingment," by Advanced Racing Technology Inc., (May 2004), pp. 1-6.
"Self-Centering Wheel Adaptors," by Hunter Engineering Co., (Jul. 2003).
"Inertial Measuring Systems with Fiber-Optic Gyroscopes," by Dr. -Ing. Edgar Von Hinuber, ATZ magazine (Jun. 2002), pp. 1-12.
"Wheel Alignment Education Guide for Heavy-Duty Trucks," by Hunter Engineering Co., (Aug. 2000), pp. 1-23.
"Digital Laser Gyro (V3)," by HONEYWELL, catalog cut sheet, pp. 1-13.
"T2 Incremental Inclinometer," web page: US Digital Corp., printed May 31, 2004, pp. 1-5.

(Continued)

*Primary Examiner*—John Barlow
*Assistant Examiner*—Cindy D. Khuu
(74) *Attorney, Agent, or Firm*—Douglas W. Rudy

(57) ABSTRACT

A gyroscope, in one embodiment a ring laser gyro, is used in an alignment measuring device for checking and adjusting alignment of a vehicle. The device includes an "x" and a "y" digital inclinometer working in concert with the gyroscope to measure various angle related to vehicle alignment.

32 Claims, 9 Drawing Sheets

OTHER PUBLICATIONS

"Highly Compact Fiber Optic Gyrocompass for Applications at Depths up to 3,000 Meters," by Gaiffe et al. pp. 1-6.
ART catalog, 15 pages.
E-Data Electronic Vehicle Measurement Data, Brochure, (Feb. 2003).
"Three-Axis Nested Fiber Optic Gyroscope," by Gilmore et al., pp. 1-8.
KVH Industries, Inc. website, printed Jan. 18, 2004, pp. 1-2.
"Optics, electronics merge to provide a sense of where you are," by Bill Schweber, how it works article, May 30, 2002, 2 pages.
"Portable Digital Electronic Gyro Vehicle Alignment and Inspection System,"by Advanced Racing Technologies, Inc. pp. 1-3.

* cited by examiner

GYRO BASED ALIGNMENT SYSTEM

BACKGROUND OF THE INVENTION

1. Field of the Invention

This invention has to do with alignment systems used for coordinated alignment relationships of independent support elements used for supporting a structure. In one embodiment, but not the only embodiment contemplated by the inventor, the structure is a vehicle having wheel and tire assemblies. Examples of wheeled structures include, but are not limited to, passenger cars, straight trucks, semi-tractor trailer rigs, motorcycles, airplane landing gear, train car axle sets, powered and un-powered carts, racing vehicles, and high performance bicycles.

A gyroscope and an integrated inclinometer arrangement is used to determine wheel angles relative to a vehicle centerline or other data plane or point. Based on data output from the gyroscope and the integrated inclinometers various initial alignment set up or realignment adjustments can be made to the target vehicle or structure.

2. Description of Related Technology

Known alignment systems run the technological gamut from string based systems, mechanical measurement systems, optical alignment systems, target alignment systems, laser-based systems and camera imaging (machine vision) systems. Today's devices for aligning a vehicle however are all systems that require significant setup time before actual alignment functions are performed on the vehicle. Production and dedicated alignment machines are cumbersome and are not designed to be transportable. Portability is one advantage of this invention.

Correct wheel/tire and chassis alignment is critical to a vehicle's handling performance, as it allows the tire contact patches to work effectively through all phases of suspension motion. Automotive research related to alignment is well developed but evolves with advances in vehicle suspension design and the improved handling of the contemporary vehicle as compared to vehicle of the late twentieth century. Production vehicles have a preferred alignment set-up depending on the application and conditions. Special purpose vehicle alignment is particularly important in high performance applications, such as racing vehicles, where small changes in alignment can have a dramatic handling impact effecting not only the handling of the vehicle but vehicle stability, rolling resistance, tire adhesion, tire wear management and high speed control, and fuel mileage considerations. However proper wheel alignment is important for all vehicles, such as racecars, trucks, cars, airplanes, trains, motorcycles, go-karts, mopeds. The present invention can also be used for aligning the treads on bulldozers, tanks, and snowmobiles and can be used for aligning a variety of other components. For instance, the system can be used in aligning structural components such as the bridge stanchions and supports, girders and beams in a building, the supports for cameras, just to mention a few diverse applications.

Vehicle manufacturers and vehicle dealerships as well as many commercial automobile and truck service facilities are equipped with sophisticated and expensive wheel and vehicle alignment systems based on the above noted technology rather than on the gyro based alignment system of this invention.

The inventor of the invention set forth herein has developed and patented several alignment systems that are laser based. Although these patents are laser based and don't rely on the use of a gyroscope as herein disclosed, they present information describing various alignment system aspects that apply to alignment systems in general. The patents referred to are U.S. Pat. No. 5,600,893 for a "Process and System for Measuring Alignment of Automotive Vehicle Suspension" and U.S. Pat. No. 6,082,011 for a "Laser Plane Vehicle Alignment System." Both of these patents are herein incorporated by reference.

Another laser alignment system is shown in U.S. Pat. No. 4,466,196 to Woodruff In this device a laser and a sensor module are provided. They are both secured to their respective spindles of the vehicle's wheels by means of a magnet. The sensor module and the laser housing each have the ability to rotate. However, mounting and setting the sensor modules and laser housing can be time consuming, and can be difficult as well depending on the configuration of the wheel rim or tire spindle. In addition, if the laser sensor and laser housing is not secured properly or consistently, erroneous measurements can result. Lastly, because the laser housing and module are constructed as a single piece, the laser can only be used for the single purpose of vehicle wheel alignment, and cannot be easily adapted or removed for other purposes.

SUMMARY OF THE INVENTION

The alignment system presented herein is based on the use of a gyroscope, in one embodiment, but not limited to, a ring laser gyro, which may include x and y axis inclinometers associated with the ring laser gyro housing and a radio communications transceiver, that is indexed to the frame centerline or other fixed data plane or point of a vehicle chassis. The invention is an alignment system that incorporates a gyroscope, such as but not limited to, a ring laser gyro. The use of the ring laser gyro replaces laser light beam systems, mirror based systems and mechanical systems that have been used as alignment systems in the past. The invention also includes the method of using a gyro scope, such as a ring laser gyro, in an alignment system and the actual use of a gyro based alignment system.

The gyro of this system is initialized to zero degrees on the vehicle centerline or reference point. It is leveled such that the x and the y inclinometers show the device, the gyro housing, is level in the x and y planes.

Specifications for proper alignment of the vehicle, including the location of the centerline or other manufacturer designated reference point, such as the chassis construction control points, usable for vehicle alignment are accessed from hard copy information pertaining to the vehicle or from an on-line database of information that includes manufacturer's chassis construction control points and alignment specifications. Specifications for the vehicle being aligned are input, either by the operator on an ad hoc basis or by downloading an appropriate file from a remote data source into a local processor, such as a desk top, lap top or palm top computer, or even a personal digital assistant or cellular telephone or the like.

Once the gyro, connected through a wireless network, or a hard wire, to the local computer, is indexed to the vehicle, typically at zero degrees in each of the x, y, and z axis, it will be moved to the next measurement point. Normally this second point is a wheel mounted fixture attached to one of the front wheels of the vehicle. The gyro will be set to be level in the x and y planes and then queried for its current location. The current location data is sent to the local computer via the radio transceiver housed in the gyro housing. The angular differential relative to the initial location will be calculated and displayed. This will correspond to "toe angle," or simply "toe," and show either toe in or toe out for the second location, that being the first wheel location, relative to the major axis of the vehicle.

The alignment system is also used for determining, in addition to the toe measurement described above, camber and caster and other vehicle critical measurements as described further on in this disclosure.

Any type of gyroscope that is relatively small enough to be portable can be used as the gyro of this application. That means that gyroscopes from the three main catagories of gyroscopes; optical gyroscopes, spinning mass gyroscopes and vibrating gyroscopes, as well as other classes of gyros such as gas rate gyroscopes can be used in this application. For instance, a ring laser gyro, a fiber optic gyro, a spinning mass gyro, a vibrating gyro, a gas rate gyro, a mechanical gyro, or the like can be used with varying effectiveness and efficiency. However, to keep this specification of reasonable length the inventor has described the invention incorporating a ring laser gyro as one embodiment preferred by the inventor. That is not to imply that other types of known or yet to be developed gyroscopes couldn't work equally well, perhaps even better than the ring laser gyro, and such other gyroscope embodiments are contemplated as being within the scope of this disclosure and the claims presented herewith.

An optical gyro, including a ring laser sensor assembly, also referred to herein as an optical gyro, a ring laser, a ring laser gyro (RLG), a fiber optic gyro (FOG), a ring laser sensor, a laser gyro or a gyro, is provided as an integral component of an alignment system and device used primarily for measuring and aligning the wheel alignment, or the frame alignment of vehicles of all types.

A ring laser gyro has no moving parts. It is compact, lightweight and virtually indestructible. All properties that are beneficial in the vehicle alignment arena where equipment is operating in a relatively harsh environment. The RLG can measure any rotation about its axis as the two laser light beams, traveling in the same path but at in opposite directions, will, in the absence of rotation, follow paths that are the same length. When the RLG is subjected to rotation there will be a difference in the path lengths traveled by the two beams, resulting in a net phase difference and resulting destructive interference. The net signal will vary in amplitude depending on the phase shift, therefore the resulting amplitude is a measurement of the phase shift and the rotation rate. Thus its orientation is known at all times. If the RLG is even slightly tilted or moved from its original set point the RLG will determine the direction and magnitude of the deviation. The ring laser sensor is mounted on a platform that is first positioned on an established centerline of the vehicle. Data corresponding to that location is transmitted and maintained in a database of an accompanying computer. The ring laser is then moved to various locations around the vehicle to measure the initial position of the element to be measured, in this case, a wheel and tire assembly of the vehicle. A look-up table corresponding to the vehicle being worked on, is accessed for details of the alignment. The look-up table is stored in an associated data base on an associated computer accessible to the operator of the alignment system.

Given that the alignment systems in use today are expensive, non portable and cumbersome, it is an object of the invention to provide an improved system and method for vehicle alignment that is less expensive than existing sophisticated systems, affordable to a majority of companies, relatively portable, and easy for a technician to setup and use.

It is also an object of the invention to provide a system for making consistent repeatable vehicle alignment measurements.

It is another object of the invention to provide a system and method for checking vehicle alignment that can be used on any make or model of vehicle, trucks, trailers, train cars, aircraft, as well as on unconventional vehicles.

It is another object of the invention to provide a system and method for checking and confirming vehicle alignment settings of a vehicle after initial alignment performed by automated alignment systems.

It is an object of the invention to provide a gyroscope based alignment system, whether it be an optical gyro, a spinning mass gyro scope, or a vibrating gyro scope, or the like, that is portable and usable in a field situation or at an alignment station.

It is an object of this invention to have an easily removable gyroscope that can be used for alignment or measuring purposes on vehicles other than wheeled vehicles.

It is an object of this invention to have an easily removable gyro that can measure toe, caster, camber, bump steer, wheel run out, thrust angle, steering axis inclination, Ackerman and steering wheel alignment.

It is also an object of this invention to provide an alignment tool that is much more accurate than alignment systems currently available.

It is an object of this invention to have an easily removable gyro is useful in inspecting damaged, bent or misassembled chassis and frame components after an accident and is helpful in locating chassis elements relative to a frame centerline or other datum reference point on a vehicle or other structure.

The above and other objects are achieved by a system including a gyro, in one embodiment, a laser gyro, and the method of checking alignment of a component of a vehicle, such as the wheels or rear axles of a vehicle, relative to a reference, such as the vehicle center line using the alignment system including the laser gyro or another class of gyro as mentioned above.

Another object of the invention is to use the gyroscope to determine the position of a tail rudder on an aircraft relative to straight ahead during flight, wheel assembly alignment and aileron angles.

Other objects and advantages of the invention will, in part, be obvious and will, in part, be apparent from the following specification.

The above and other objects are also achieved by an alignment system for measuring toe, camber and caster of a vehicle. The laser gyro is used to make toe, camber, caster and axle alignment measurements relative to the center line or another reference line of the vehicle.

The preferred embodiments of the inventions are described below in the figures and detailed description. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the detailed description is not intended to indicate a desire to invoke the special provisions of 35 U.S.C. Section 112, ¶ 6, to define the invention. To the contrary, if the provisions of 35 U.S.C. Section 112, ¶ 6, are sought to be invoked to define the inventions, the claims will specifically state the phrases "means for" or "step for" and a function, without also reciting in such phrases any structure, material or act in support of the function. Even when the claims recite a "means for" or "step for" performing a function, if they also recite any structure, material or acts in support of that means of step, then the intention is not to invoke the provisions of 35 U.S.C. Section 112, ¶ 6. Moreover, even if the provisions of 35 U.S.C. Section 112, ¶ 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

The preferred embodiments of the invention presented here are described below in this disclosure and the accompanying drawing figures. Unless specifically noted, it is intended that the words and phrases in the specification, in the Abstract, and in the claims, be given their ordinary and accustomed meaning as used by those of ordinary skill in the applicable arts. If any special meaning is intended for any word or phrase, the specification will clearly state and define the special meaning.

BRIEF DESCRIPTION OF THE DRAWINGS

Various embodiments of the present invention are described below with reference to the drawings, wherein like designations denote like elements. Similar or "handed" elements may share the same element numbers or may be appended with an alpha indicator to generally refer to similar or identical elements. The invention will be readily understood when the following description is read in conjunction with a perusal of the drawing figures in which.

DESCRIPTION OF A PREFERRED EMBODIMENT OF THE INVENTION

The invention will be understood and its advantages appreciated by a perusal of the attached drawing figures when viewed in light of the teaching provided by this disclosure. An example of a preferred embodiment of the invention is set forth herein, however the inventor contemplates that other embodiments that follow the teaching of the invention are contemplated by the inventor and such other related embodiments are intended to be encompassed by the claims appended to this document. For instance, this specification describes one embodiment of the invention as a laser gyro based system. The inventor contemplates that other types and classes of gyroscopes can be used in this invention and such other gyroscopes and types of gyroscopes should be treated as being disclosed in this specification as somewhat interchangeable embodiments with the primary embodiment discussed here.

In a preferred embodiment of this invention a ring laser gyro is used as the core component of an alignment device for use in vehicle alignment operations. A complete automobile alignment will include checking and adjusting to specification front wheel (front wheels are usually the "steer axle") toe angle, camber angle, caster angle. Bump steer may also be adjusted especially in applications related to race car suspensions. Rear wheel adjustments for vehicles with independent rear suspension include some of the same checks as made to a front axle vehicle, that is, toe angle and camber angle, and further include thrust angle and possibly, location of the wheels in a relationship parallel to the major axis of the vehicle (assuming a conventionally proportioned vehicle). Rear wheel adjustments, for vehicles with "solid," or "live axles," may consist of checking thrust angle, axle offset and rear axle toe. Normally these checks, except perhaps for thrust angle, are not routinely performed during a normal alignment service.

The following disclosure is directed generally to an alignment service operation for a passenger car. Alignment services for trucks; busses; trains, where there is more than one axle mounted on the trucks of a railcar; and other wheeled vehicles can be envisioned and easily applied by a person of skill in the alignment art after reading this disclosure.

Figure 1:
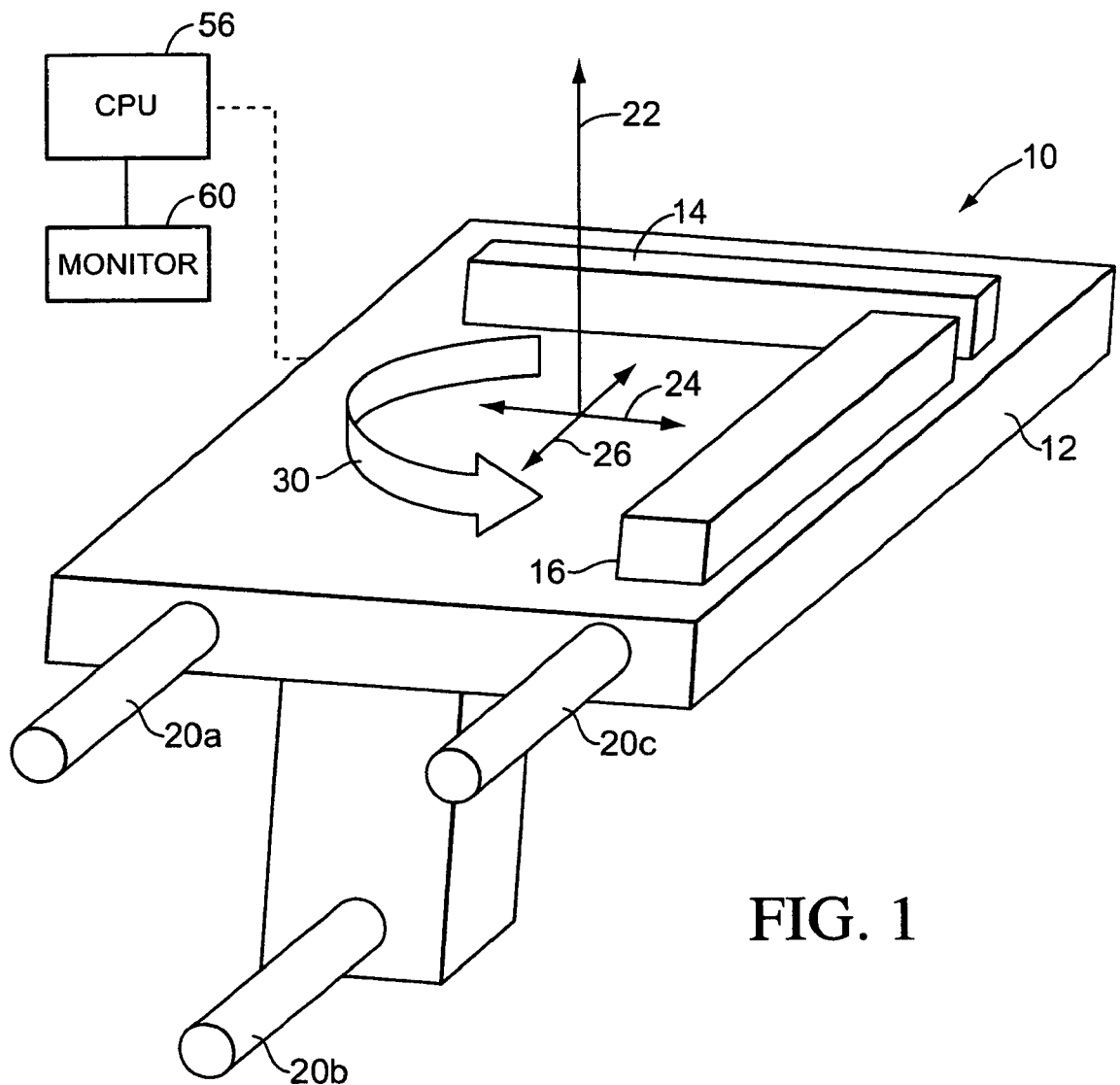
FIG. 1 is pictorial representation of a ring laser gyro, associated and integrated inclinometers, a housing, and interface probes.

Turning first to a pictorial representation of one component of the device, FIG. 1 is an illustration of a ring laser gyro head unit, generally 10. A ring laser gyro of the type used in this invention is produced by Honeywell Corporation's Sensor and Guidance Products division. The Honeywell product is Model GG1320AN ring laser sensor. The ring laser gyro includes a laser block assembly based on a triangular two inch per leg, path-length equilateral glass ceramic block having an internal electronics package. Another alternative gyroscope is the type available from KVH as a compact FOG (interferometric fiber-optic gyro). KVH provides, as Model DSP-5000, a single axis, strap down FOG in a compact enclosure along with a processor-based electronics package. Other types of gyro, such as other optical gyros, spinning mass gyros, vibrating gyros, or other gyros such as but not limited to gas rate gyros present other embodiments of this invention.

For one preferred embodiment set forth herein, the invention will be described using the ring laser gyro of Honeywell as a preferred gyroscope. The head unit, generally 10, contemplated for use in a preferred embodiment of the invention, comprises a housing 12 that accommodates the ring laser gyro ("RLG") mounted securely in the housing 12, as well as an X-axis inclinometer represented by item 14, and a Y-axis inclinometer 16. The inclinometers are digital devices that measure angular displacement from a gravitational plane. Digital inclinometers of the type contemplated for carrying out this invention, but not the only inclinometers that will work well as part of this invention, are available from U.S. Digital Corporation of Vancouver, Wash., USA (Model T2 Incremental Inclinometer).

Surface contact probes 20*a*, 20*b* and 20*c* are connected to the housing 12. These probes are used to set the initial reference plane, for statically locating the head to measure all other reference planes relative to the initial reference plane. These probes may be used to locate the housing or head 12 on a wheel and tire assembly, if the unit is being held in position by a technician, or will be carried in a support and interface with the support in holding the head 12 to a wheel and tire assembly as will be discussed further on. The housing 12 may also incorporate a radio communications transceiver for sending and receiving data between the housing 12, the CPU 56, and optionally audio input and output to a headset worn by the operator (not shown).

The ring laser gyro (herein sometimes referred to as the "RLG") includes onboard electronics that are used to calculate the delta between an initial location and the position of the RLG as it is moved from one location to an other location on the vehicle. In the single plane ring laser gyro shown in FIG. 1, only the movement of the ring laser gyro away from a first position relative to the vehicle where the RLG was centered, to a second location, where the RLG was moved to, will be registered in the internal processor in the head (or an external processor) as the delta, generally expressed in angular degrees of measurement representing movement of the gyro.

The ring laser gyro axis centerline is represented in FIG. 1 by the vertical line 22 while the x-axis and the y-axis, are shown as 24 and 26, respectively. The directional arrow 30 indicates the direction of rotation of the gyro in a horizontal plane.

Figure 2:
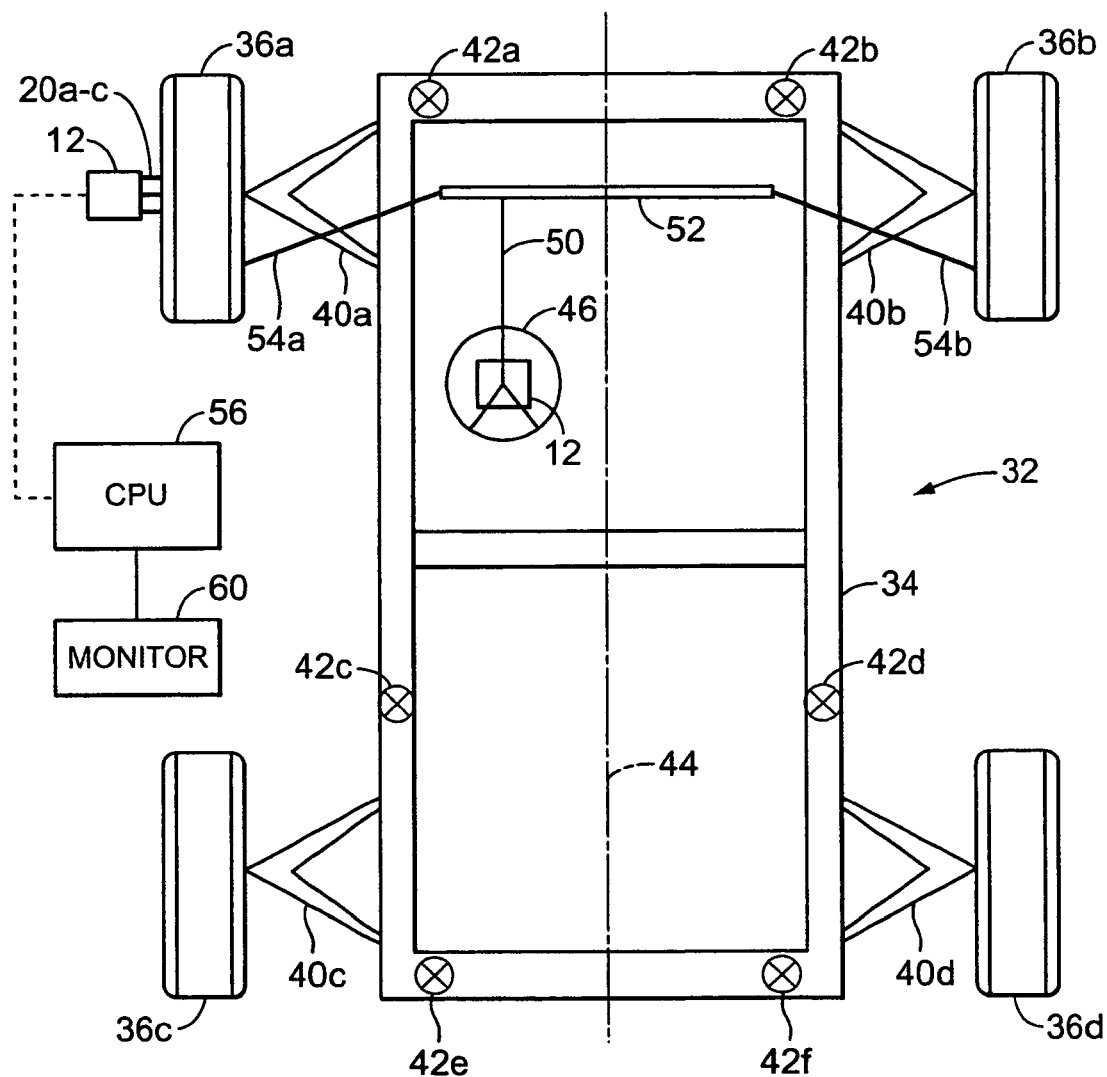
FIG. 2 is a pictorial representation of the chassis of a four wheel vehicle showing some suspension components and the wheel and tire assemblies of the vehicle.
Figure 3:
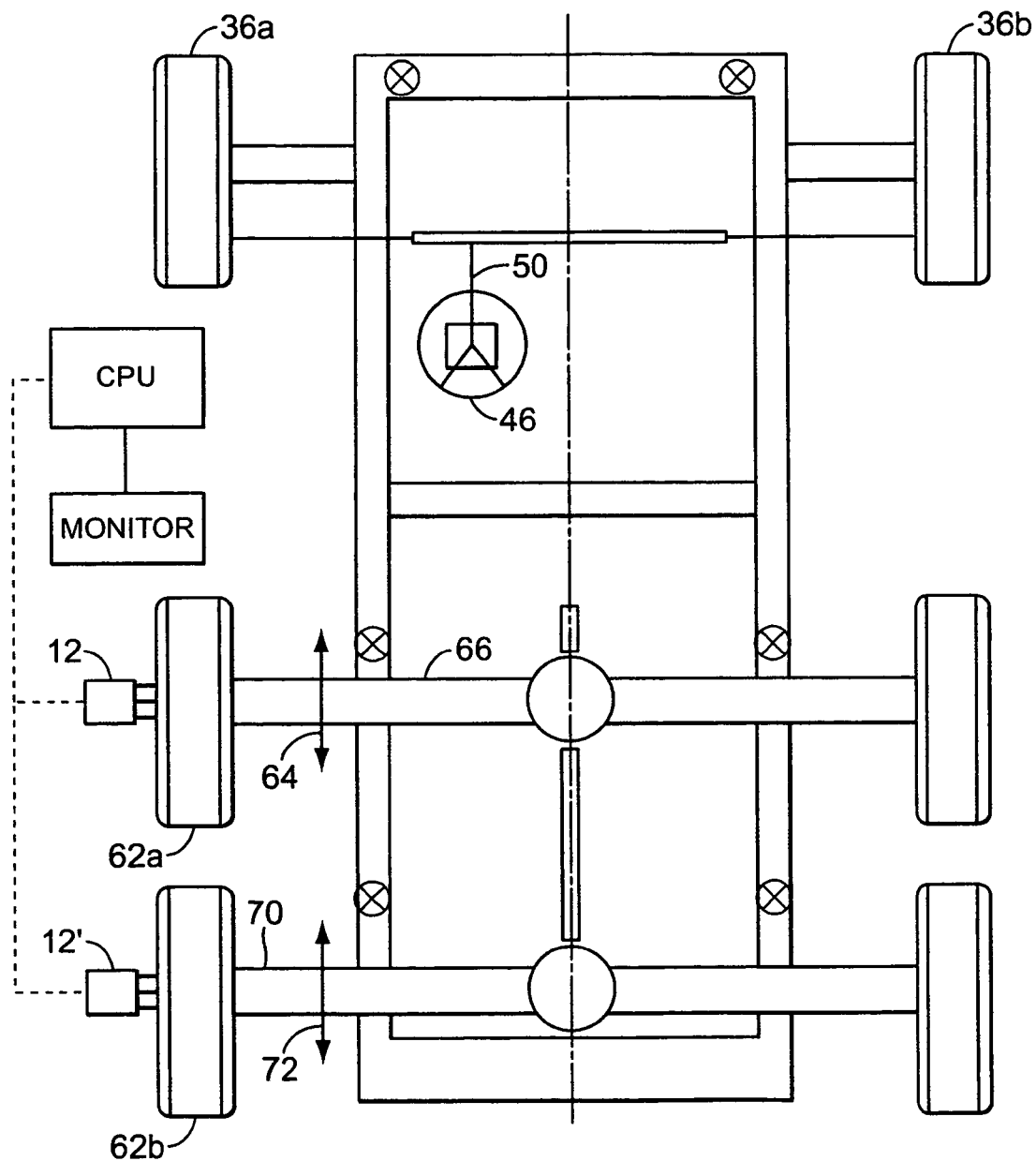
FIG. 3 is a pictorial representation of the chassis of a heavy duty truck having three axles including two sets of drive wheels.

The method of using the head 12 in a vehicle alignment operation is shown diagrammatically in FIGS. 2 and 3. In FIG. 2 a vehicle, generally 32, includes a frame or chassis, 34, which is the platform to which four wheel and tire assemblies, 36a–d, are attached through suspension links or arms 40a–d. The frame 34 may include a plurality of chassis construction control points 42a–f. The chassis control points are locations on the frame that are used by the vehicle manufacturer for reference points during the manufacture of the vehicle and may be used for post-manufacturing alignment reference points, as they are in the context of this invention.

The chassis construction control points 42a–f, are derived from the vehicle manufacturer's build data points. These build data points are available from various vendors. For instance, such information is available from Snap-on Technologies, Inc., under the moniker "Blackhawk," marketed as "EDATA, Electronic Vehicle Measurement Data." The data is available by accessing the EDATA site on-line to authorized users, and selecting and downloading (to the CPU 56) the frame reference point data as well as the alignment specification. Vehicle dimension systems from other vendors are also available.

In FIG. 2, construction line 44 indicates the frame centerline, which corresponds to the major axis of the vehicle. Alignment measurements are often taken from the vehicle frame centerline which has been established by measurements taken from the chassis control points 42a–f. Measurements may also be taken from a known location, such as two chassis control points in an aligned plane parallel to the major axis of the vehicle. The ring laser gyro head 12 can be initially set up on the established vehicle centerline, or on the major axis as determined from known chassis control points, or either of them, using a trammel bar to provide a convenient mounting location and probe 20a–c contact points for the initial location of the housing 12 (FIG. 1).

Also shown in FIG. 2 is the steering wheel 46, the steering shaft 50, a transverse link 52 such as, in this case, a rack component of a rack and pinion steering assembly, and tie rods 54a and 54b. In this embodiment the vehicle shown represents a four wheel independent suspension equipped vehicle with steerable front wheels and independently sprung, non-steerable rear wheels. This is a contemporary configuration found on many vehicles.

The procedure for aligning a vehicle can be understood by referring to FIG. 2. The inclinometers are set to zero relative to the surface the vehicle is on. After that the process of performing the alignment starts with straightening the steering wheel 46. The steering wheel will be set to be generally horizontal, that is the "legs" of the wheel will be angularly displaced an equal amount from a vertical plane centered on the steering wheel. Precision by the operator is not critical in initially setting the steering wheel to a horizontal position. The ring laser gyro housing 12 is attached to the steering wheel when the steering wheel is generally horizontal. The gyro may be leveled but it is not required for a normal alignment. The adjustment for centering the steering wheel is made using the ring laser gyro and the operating software and algorithms either on board the RLG assembly or resident in the CPU 56. The steering wheel, with the head 12 attached to the steering wheel, is rotated approximately ten degrees clockwise and then ten degrees counterclockwise as measured by the x-axis inclinometer of the head 12. As the x-axis horizontal inclinometer passes through zero on the inclinometer the steering wheel 46 is horizontal and this will be the starting point for the alignment. It is desirable that the steering wheel be centered and horizontal at the completion of the alignment job. The steering wheel lock, not shown, but a common device on modern vehicles, is applied when the wheel is centered. The ring laser gyro angle is recorded and compared to steering column angle data as gleaned from data downloaded from a dimension retrieval system data base to the CPU or information otherwise available to the operator. Setting the steering wheel before measuring and adjusting the adjustable links of the vehicle's suspension assures the technician performing the alignment job that subsequent adjustments to the vehicles steering linkage elements will not displace the steering wheel from its centered position.

The next step in the alignment process is performed with the ring laser gyro head 12 held against a first wheel to sample and record the initial wheel alignment position. The next normal step is mounting the head to, or aligning the head with, the front wheels of the vehicle. The head is mounted to, carried by and attached to the wheel using a wheel fixture of a type known in the industry. One type of mounting device is a telescoping device that has four mounting bars that will hook into the external bead area of a wheel. It is firmly mounted to the wheel and provides a mount or carrier for an alignment head. The head 12 is mounted to the wheel 36a such that surface contact probes 20a–c, contact the wheel. The surface contact probes 20a–c, (alternatively there may be more or less than three surface contact probes shown and described herein) may be interchangeable with the mounting bars mentioned above to provide the dual function of mounting the head to the wheel and providing a secure fixed interface between the wheel and the mounting for the alignment head. The ring laser gyro head 12 is then leveled in the plane corresponding to the x-axis using the x-axis inclinometer. At this point the onboard computational capability of the ring laser gyro determines toe angle from the difference between the initial setup location corresponding to the vehicle frame centerline and the mounted position of the ring laser ring gyro head 12 on the wheel 36a. The y-axis inclinometer 16 indicates camber angle simultaneously with measuring of toe angle. The computed toe angle and the observed camber are each recorded in the local processor configured to communicate with the ring laser gyro head 12. At this point the alignment technician begins to make adjustments as necessary.

Adjustment of camber is performed first. Camber is sensed by the y-axis inclinometer 16 and the recorded value is compared with the vehicle specifications. Camber adjustments are performed many different ways. Modern vehicles may have a camber plate locating a suspension strut. The location of the upper end of the strut in a strut plate located relatively high on the vehicle chassis determines camber.

Another method of camber adjustment is the use of shims between suspension components and the vehicle frame. Adjustment is usually accomplished by adding or subtracting shims from between the upper control arm of the front suspension and the vehicle frame. An alternative camber adjustment system incorporates an eccentric bushing mount locating the inboard end of the lower control arm of the suspension. The eccentric bushing is rotated to the desired degree of camber and locked in position. Many other camber adjustment techniques are known in the industry.

Caster angle at wheel 36a is checked next. The wheel 36a is turned left twenty degrees. An audible signal may be used to alert the alignment technician when twenty degrees is achieved. The wheel will then be turned right twenty degrees, another audible signal is generated. Data information is collected at increments through the left and right turning maneuvers with minimal but adequate data recorded at the plus and minus twenty degree points. With this data measured by the x-axis inclinometer 14 and recorded in the data base resident in the memory of the head 12 or the CPU 56, the caster angle on the measured wheel is calculated. Calculated caster angle is then compared to specified caster angle and an appropriate adjustment is made.

Toe angle adjustments can be performed at the completion of camber checking and adjustment and castor checking and adjustment if necessary. Data output to a monitor 60 will indicate the angle of toe, either toe in or toe out, of the left front wheel assembly 36a. If it is "out of spec" the technician will adjust the left side tie rod 54a, in or out, depending on the toe angle determined by the ring laser gyro until the toe is brought into specification. The technique for adjusting toe, by adjusting the vehicle's tie rod lengths, is well known in the alignment service business. With left side toe properly adjusted the technician will turn to camber angle adjustment and adjust camber of the left front wheel to specification.

The usual alignment adjustments performed on vehicles on a routine basis include toe angle and camber angle adjustment. Caster adjustment is not ordinarily performed in a routine alignment job as most cars have the caster angle set at the factory. However, caster is almost always checked by alignment shops and the data compared to frame book information. Also in the event of front end damage due to an accident; camber, Ackerman, and steering axis inclination (or king pin inclination on older cars and trucks with king pins rather than ball joints) is checked to diagnose bent spindles, struts and mislocated cross members and repaired, replaced and adjusted as necessary.

With the toe and camber adjustments made to the left front wheel the alignment technician will return the steering wheel to the original centered position by turning the steering wheel until the desired toe measurement is registered. He will then lock the steering wheel at the now centered position. Toe angle may be several degrees from straight ahead after it is properly set on the left side wheel. All final measurements of the left front wheel will be recorded in the CPU. The technician will then move the head 12 to the right front wheel 36b and repeat the process of setting the toe and camber as described above.

While addressing the measurements and adjustments to the front wheel the Ackerman steering setup of the vehicle can be checked. Turn plates are placed under the front wheels and the vehicle is steered through its full motion. If the "Ackerman," basically the steering angle of the inside wheel relative to the steering angle of the outside wheel (the outside wheel requiring less steering angle), is satisfactory, it is noted. If it is out of specification, parts replacement or adjustment is necessary. Ackerman checking will begin by checking a first steerable wheel (of two steerable wheels on a single axle). The steerable wheel will be set straight ahead, the gyro set up on the first wheel, either held by hand or mounted to the wheel using a bracket, and the gyro set at zero degrees. The steered wheel, usually using the steering wheel to turn it, is then turned a number of degrees, for example twenty degrees or however far you want the Ackerman checked. After the steered wheel is positioned at twenty degrees, the record data is recorded and the head unit is moved to the other steerable wheel on the same axle and positioned on or aligned with, the second steerable wheel. The reading is taken at the ring laser head and compared, in this case, summed with the first reading, to output the Ackerman measurement. If this measurement is nineteen degrees the Ackerman is one degree total Ackerman over twenty degrees.

Two head units can be used for checking Ackerman to save one step in the above process. If a second ring laser gyro head is attached to the other steered wheel on the steering axle of the vehicle. (It is pointed out that there are technically two separate axles comprising the steering axle of a contemporary independently sprung front axle vehicle. Referring to the steerable axles in the singular, i.e. the steerable axle, is colloquially acceptable and herein adapted.) With two head units the steering angle can be read directly and the relative positions of each wheel as it is turned is measured, recorded and used to compute Ackerman.

After completing the right front toe and camber adjustment of wheel and tire assembly 36b, the head 12 is moved to the rear axle, starting at wheel 36c or at 36d if it is more convenient for the operator, and as long as he loads into the CPU and/or the head 12, the location (the wheel and tire assembly location, i.e. left rear or right rear) of the head 12. If the vehicle is an independently sprung rear axle vehicle, rear axle toe and camber is checked and adjusted if necessary. There is no caster adjustment for the rear axle on a conventionally steered vehicle as there is no caster built into the rear axle. It is, however, known that there are several vehicles produced in the past and new vehicles on the market today that have active or passive rear wheel steering. This may become a popular offering. In such rear steer vehicles it could be necessary to adjust caster but this would be unusual. On the other hand, adjustment of camber, toe and possibly bump steer adjustments will be necessary on such rear steer vehicles. Obviously, vehicles that have rear steer only, will be aligned similar to conventional drive front wheel steer vehicles, with toe angle, caster, camber, and optionally bump steer adjusted on the rear wheels. The device disclosed herein can easily be used to adjust such rear wheel steer vehicles.

Figure 4:
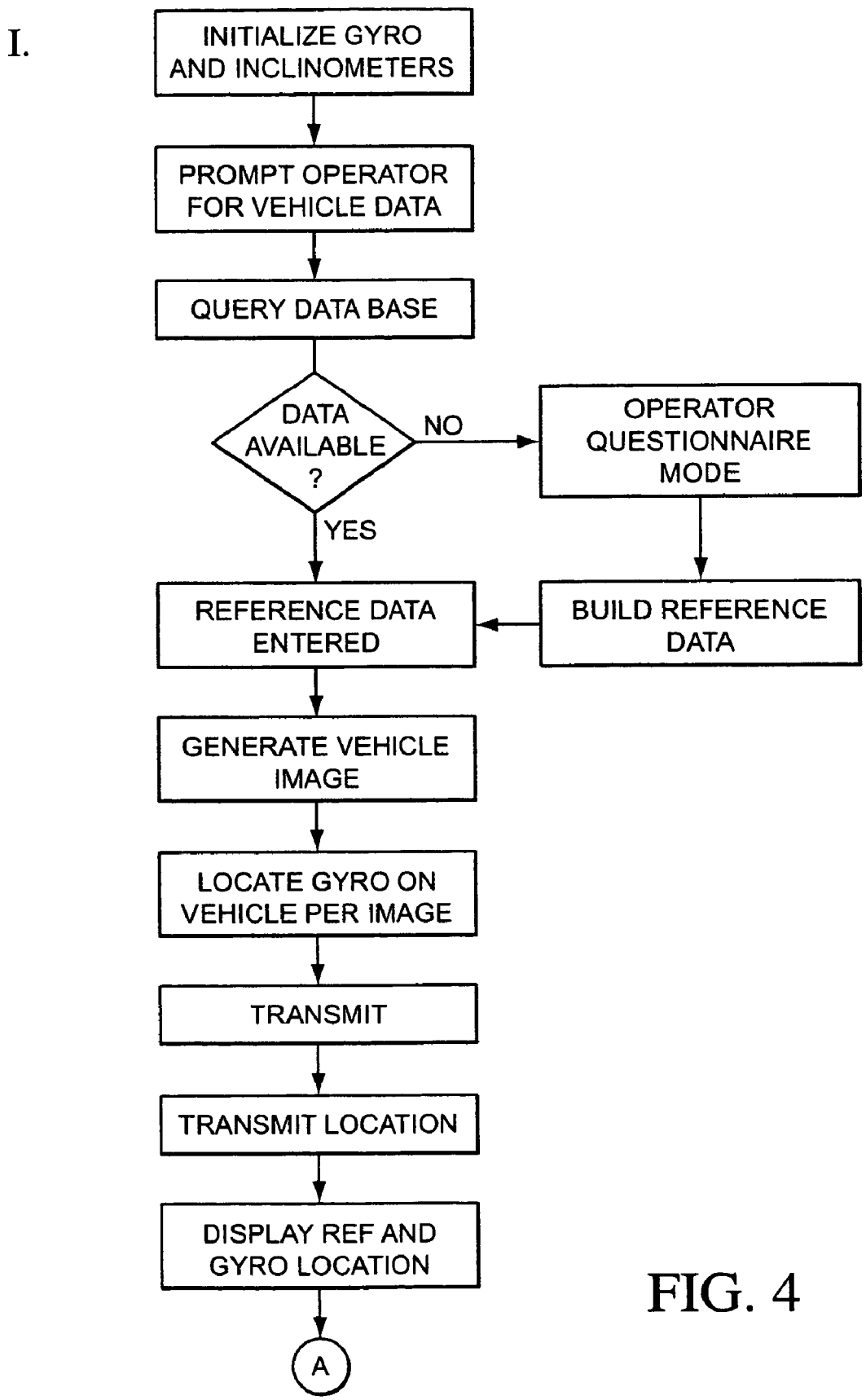
FIG. 4 is a flow chart illustrating significant operating steps in the process of checking and setting the alignment of a vehicle.
Figure 4:
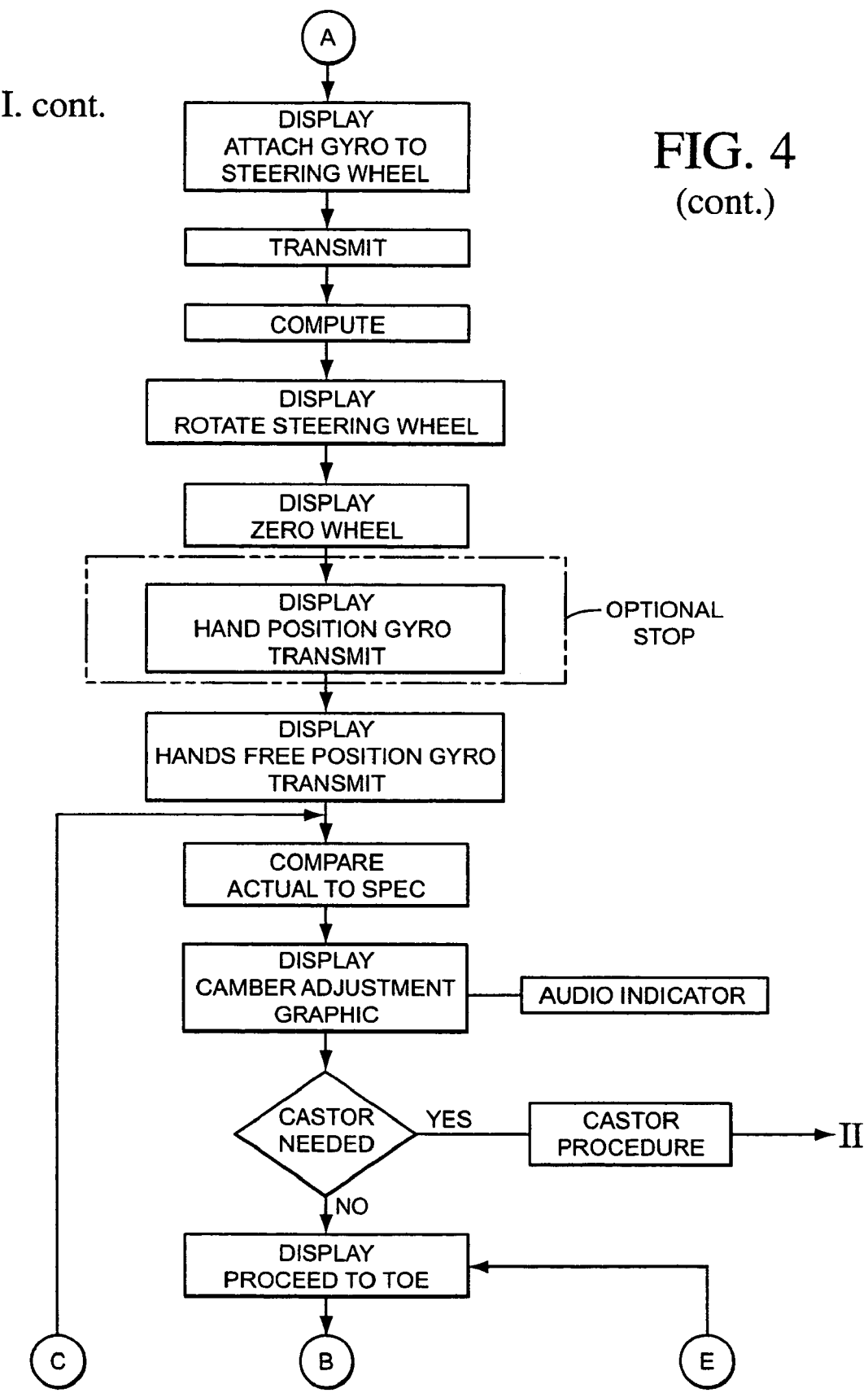
Figure 4:
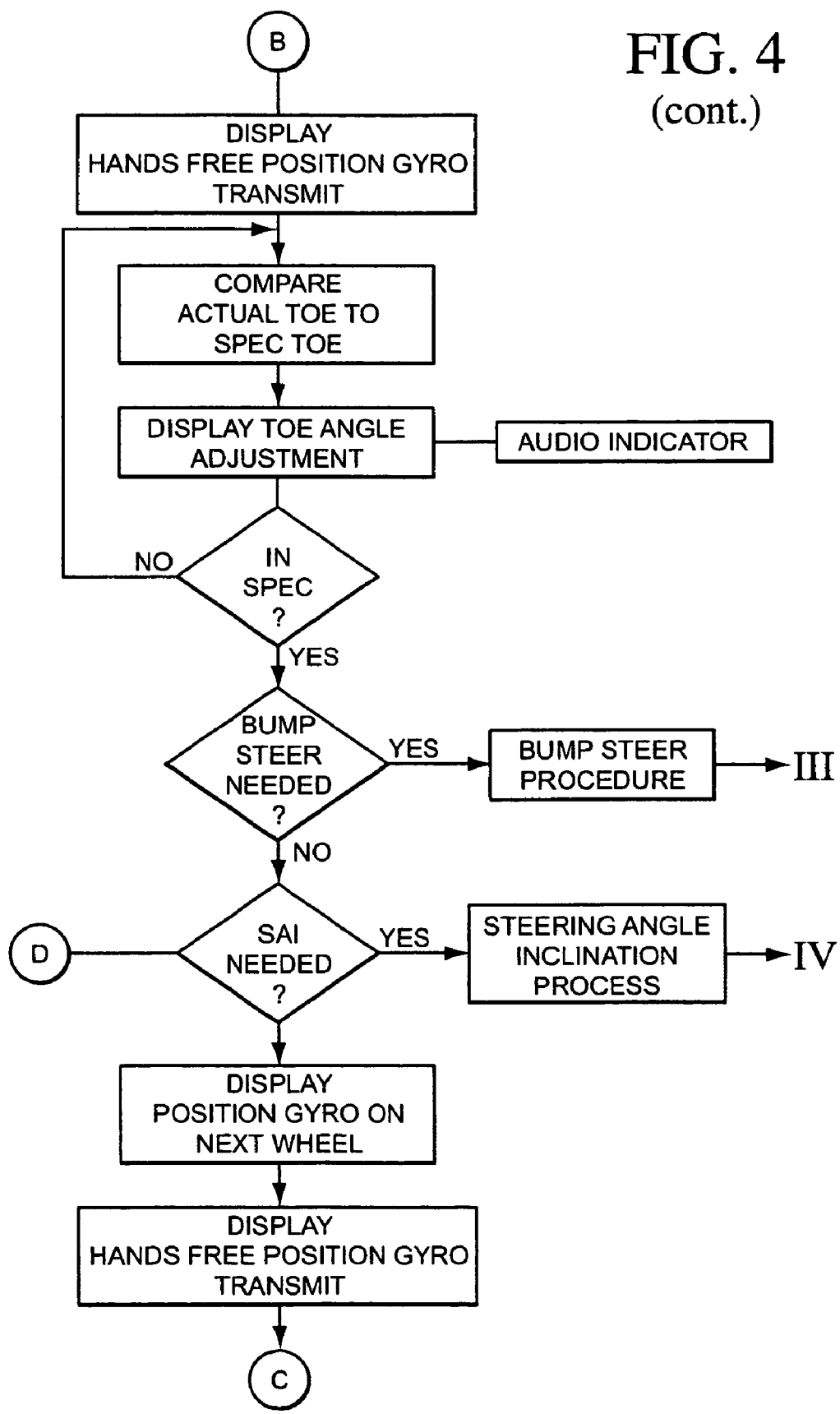
Figure 4:
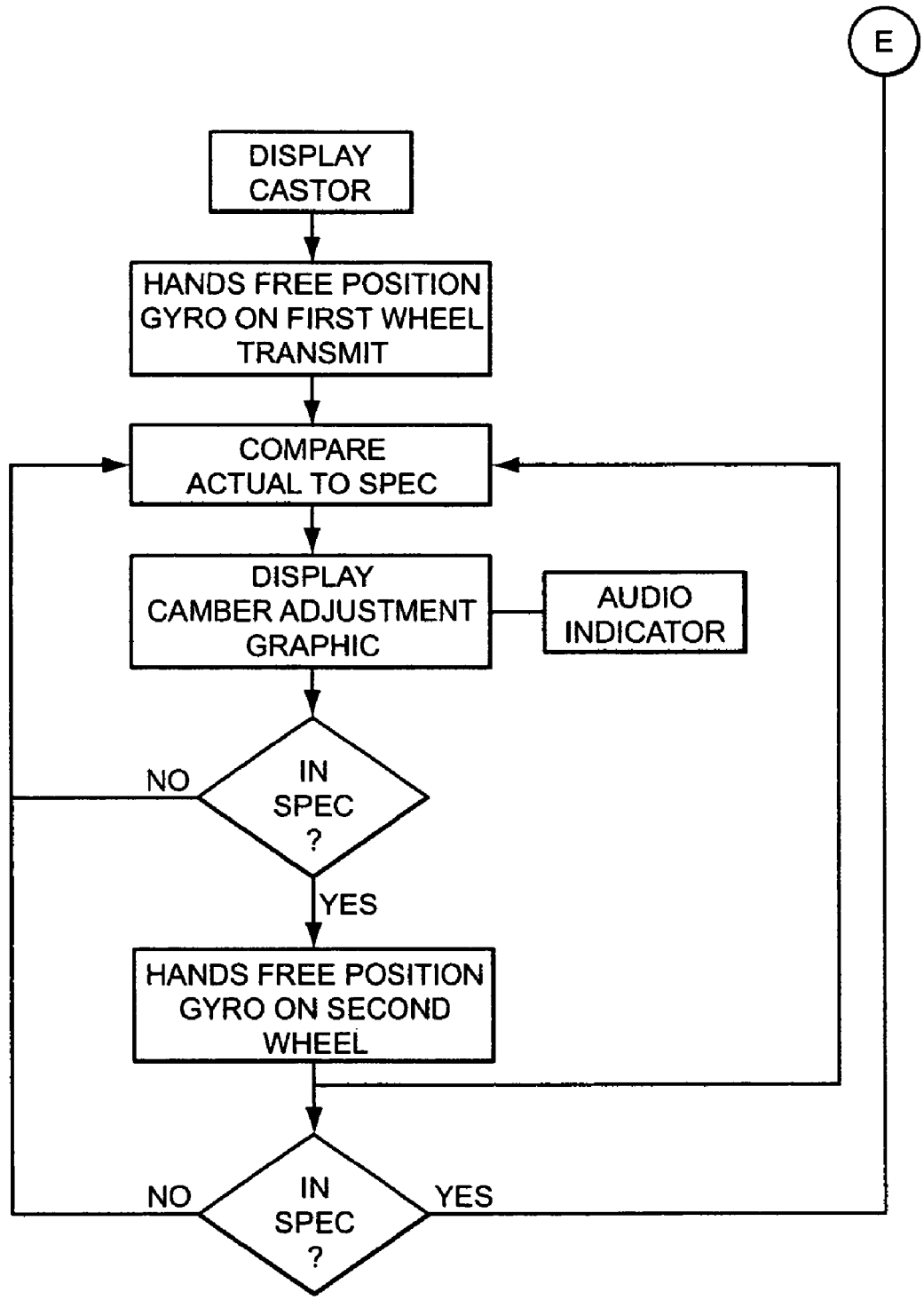
Figure 4:
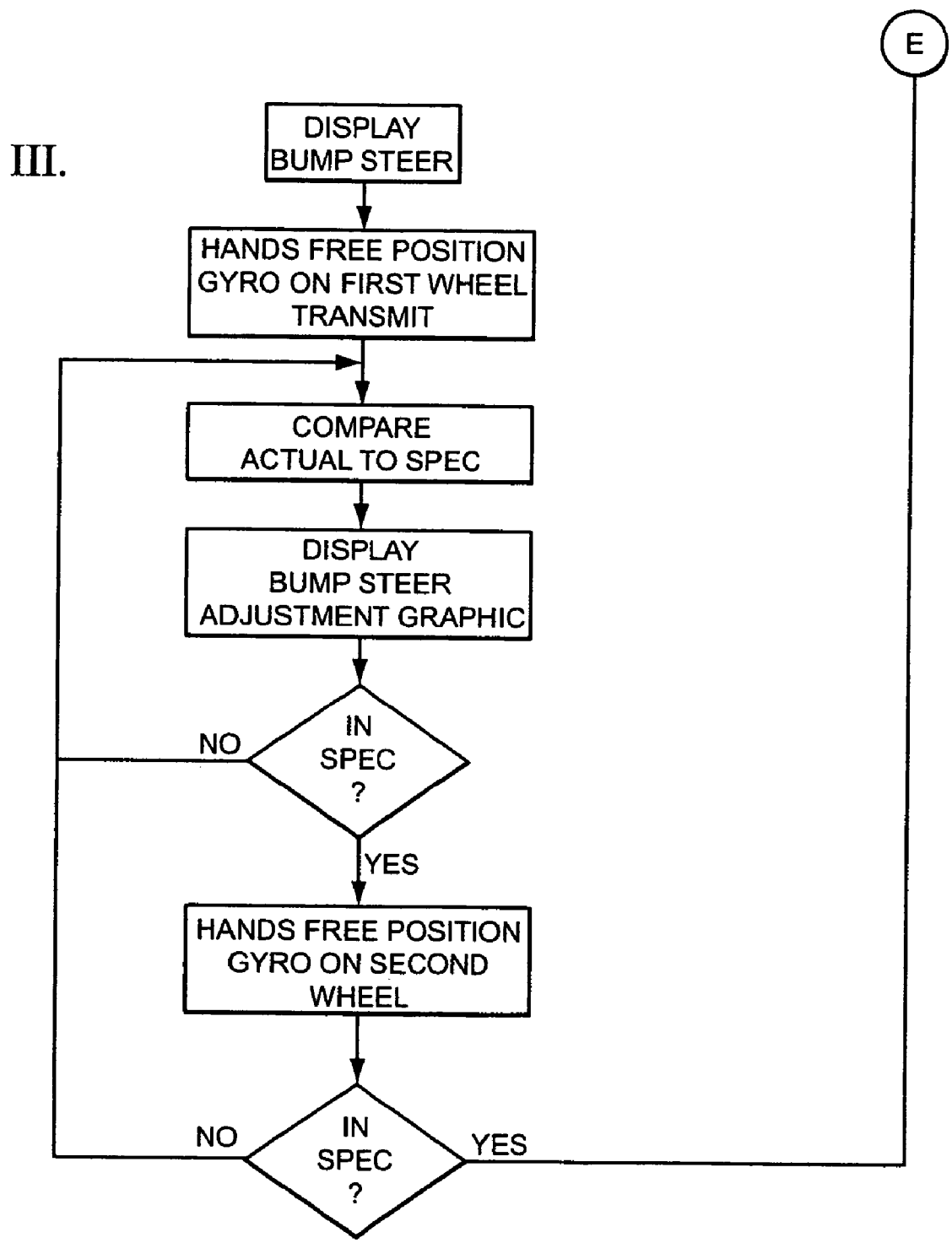
Figure 4:
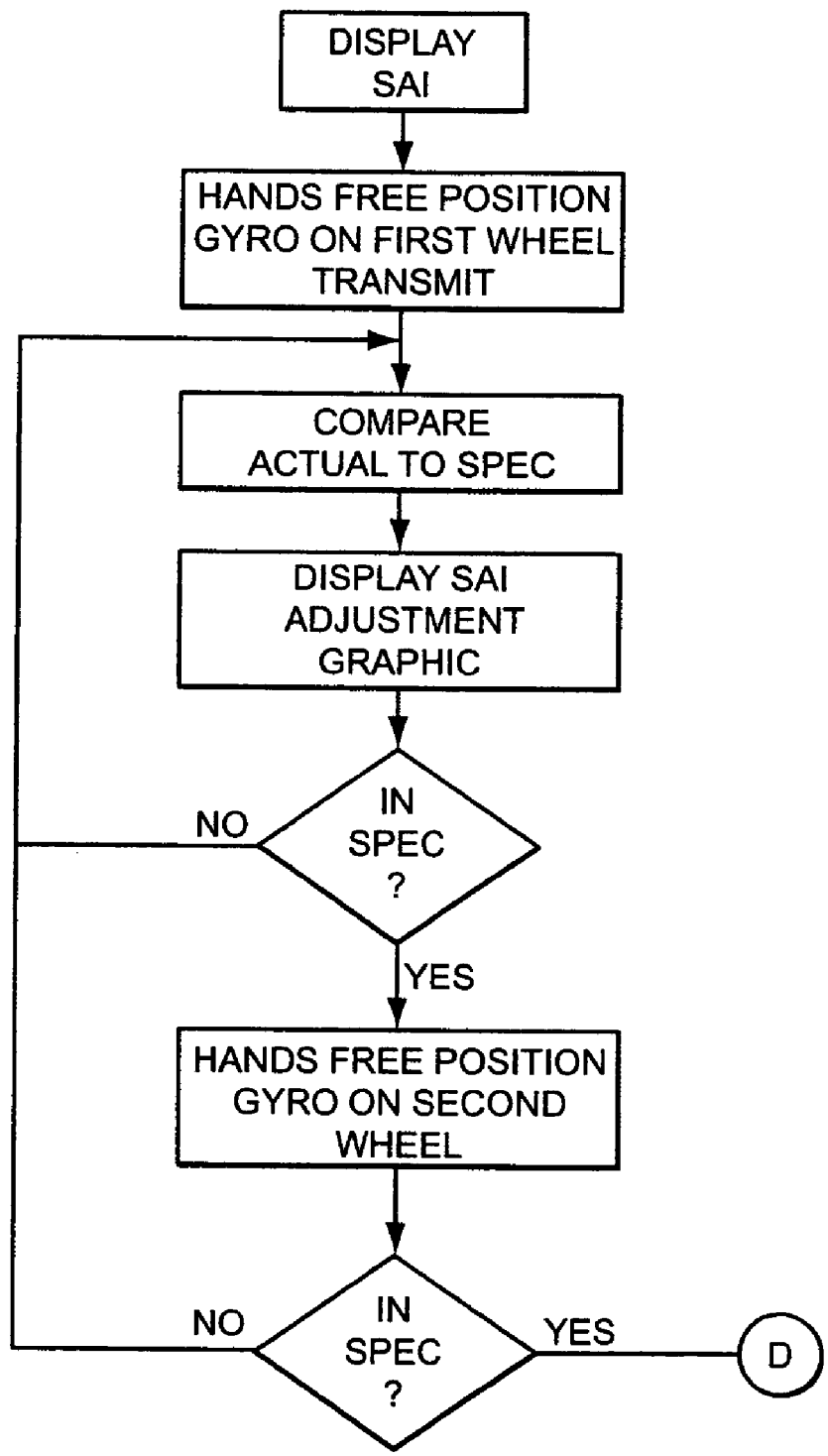

FIG. 4 is a flow chart to show the more significant steps in performing an alignment operation as just described. This figure is provided to fill any gaps in the above description but is not meant to be a chart that shows the only way the alignment steps may be taken. Other paths of performing the alignment are possible, for instance, foregoing the steps of aligning the steering wheel, and contemplated by the inventor and other paths would be configurable by persons having skill in the art after being exposed to the concept of using a laser gyro in alignment operations as is disclosed herein. The steps in FIG. 4, Item "I" include initializing the gyro and zeroing the inclinometers relative to the vehicle surface. This operation is prompted by a graphic on the monitor as well as audio direction from the processor to the technician/operator. The operator is prompted for vehicle type, the make and model of the vehicle. Based on that information the necessary data for the subject vehicle is retrieved from the data base, the data base being either stored in memory of the local processor or available from a remote source. If vehicle data is not available, that is, the vehicle data is not stored in the processor, either data will be input from storage media or will be downloaded from a remote processor or system. If data is not available to be directly loaded into or accessed by the processor, the processor will enter a questionnaire mode, displayed on a monitor communicating with the processor, to query the operator about the vehicle to determine an alignment solution. This information may be saved and refined and used in subsequent events for the same of similar vehicles. With the data retrieved, or otherwise input, by the processor, a pictorial representation of the subject vehicle is displayed on the screen or monitor viewable by the operator.

The operator is then prompted to locate the gyro unit (also referred to as the "head unit") at the location shown on the screen. This will be a reliable reference point such as a data chassis control point, a trammel location or a location on a frame member. With the gyro unit located per the screen information, the operator will transmit the gyro's location to the processor. The processor will then sense gyro stability and transmit the gyro location to the host processor and return a signal to the gyro initiating tracking mode. The monitor connected to the processor will then display a graphic showing vehicle centerline or reference point. The angular position of the gyro is then displayed in real time on the monitor.

The gyro angular position and both X and Y inclinometers record relative position. Gyro tracking mode is activated after the operator transmitted gyro location above. In tracking mode the gyro and both inclinometers are poled continuously until the completion of the alignment operation on the subject vehicle with the gyro and inclinometer data being transmitted to the host processor by a wireless communication. Hard wire communication between the processor and gyro and inclinometer is also an option.

Next the gyro will be used to calibrate the steering wheel position. The operator will be prompted by a monitor image to and audio signal to attach the gyro to a steering wheel fixture, and then attach that assembly to the steering wheel. With the gyro associated with the steering wheel the operator will transmit a signal to the processor. The gyro will now be in the calibrate mode.

The calibration is performed by the processor interrogating the gyro and inclinometers. As the steering wheel passes through zero degrees indicated by the inclinometer the gyro angular position is recorded. Angular position is compared to the stored vehicle data, typically the manufacturer's construction data, for steering column angle. That data is compared to sensed data for the subject vehicle. If the data is out of specification or otherwise abnormal the operator is prompted to investigate. This operation of steering wheel alignment will have no effect on actual wheel alignment other than to have the steering wheel pointed "straight" when the steered wheels are straight.

To perform the steering wheel setting or alignment operation the operator is prompted to rotate the steering wheel clockwise or counterclockwise based on its starting position until the x-axis inclinometer passes through zero degrees. The operator will watch the monitor where a graphic representation of the steering wheel and the real time angular position is displayed. Once the wheel is rotated past zero degrees the operator is prompted to rotate the steering wheel back to zero degrees as displayed on the monitor and audio informed. With the steering wheel at zero degrees the operator will lock the wheel in place using the vehicles steering column lock or through use of an independent locking mechanism that will hold the steering wheel in the zero degrees position. This zero degree steering wheel position will equate to a straight ahead steered wheel position.

The next step in the alignment process is the alignment of the steerable wheels starting, usually, with the left front wheel. The operator is prompted, by a monitor graphic, to remove the gyro from the steering wheel and steering wheel fixture and attach the gyro to a hand-held fixture. The hand held fixture is placed against the left front wheel and the onboard transmit button is cycled to transmit a signal to the processor. The hand-held wheel fixture is used to take an initial reading of the current, preadjustment toe angle and camber angle of the left front wheel.

The justification for performing the hand-held reading at the start of an alignment operation is that there is an inherent design flaw in wheel alignment systems using only hands free wheel fixtures. The flaw results in undetectable errors introduced by the nonrepeatability of mounting the hands free wheel fixture to a wheel. By initially reading and sampling a wheel's actual position prior to mounting the gyro to the hands-free wheel mounting fixture the system disclosed here is able to eliminate this common problem. When the gyro is subsequently mounted to the hands-free wheel attachment fixture and then to the wheel, the gyro and inclinometer data is transmitted to the processor. Any delta found between the first hand-held reading and the second hands-free wheel mounted reading is detected, recorded and introduced into the processor algorithms to compensate for inaccuracies due to the inconsistent hands-free mounting of the gyro to the wheel. Thus the system disclosed in this specification eliminates the error induced by inconsistent hands-free wheel mounting operations in this and in existing systems.

With the gyro attached to the left front wheel the camber will be adjusted if necessary. If adjustment is necessary, comparing the specification in the processor with the sensed camber, as shown on the monitor the operator will adjust camber. In addition to the monitor graphic an audio signal is broadcast to allow visual free operator adjustment of camber. When camber adjustment is achieved a special audio tone will be emitted by a processor controlled emitter. The monitor will have real time status of camber before, during and after adjustment.

If caster adjustment is required, an infrequent situation, the processor will recommend that the adjustment be made. If the operator elects to perform a caster adjustment the processor will prompt the operator through the castor adjustment procedure for the subject vehicle. As with camber adjustment, audio and real time monitor graphics will inform the operator on castor status before during and after any adjustment is made.

After the camber adjustment the next adjustment will be toe angle. The operator will be prompted to adjust left front toe angle. Adjustments will be made, usually by adjusting tie rod length, until toe is set to specification. The operator will be prompted as above during his adjustment of toe. The monitor will display real time toe angle, computed from data sent from the gyro and processed in conjunction with toe data stored or downloaded to the processor, and emit a special audio tone when toe is within specification so the operator can make the adjustment without having to have line of sight access to the monitor.

With toe angle adjustment completed the adjustment of bump steer and steering angle inclination maybe adjusted.

These are not normally adjusted when the subject vehicle is a street car of truck. Bump steer and steering angle inclination are often adjusted on racing cars however. The processor, in the normal alignment operation situation, will advise the operator if bump steer and or steering angle inclination is required. The decision is with the operator. If adjustments are to be made the operator will be prompted on the steps to perform the function and the results of the adjustment are shown on the monitor.

The foregoing steps pertain to the left front wheel. With that wheel adjusted the gyro is moved to the other side of the vehicle and the right front wheel is adjusted. Camber, castor if needed, toe, bump steer if needed, and steering angle inclination if needed are performed as was done for the left front wheel. If there are other steerable wheels on the vehicle these are also adjusted. Non-steerable wheels can also be checked for camber and toe and if adjustable, can be adjusted as appropriate.

The alignment process above pertains to a conventional automobile. The alignment process for alignment of a heavy duty truck as represented in FIG. 3 also includes adjustments to the rear axles of the vehicle. The steering axles, represented by the steerable wheel and tire assemblies 36a and 36b are aligned as is described above. The steering wheel 46 is centered as above. Camber and toe are usually checked and adjusted. Checking caster is optional. With the front end aligned the head 12 is moved to a first of the two drive axles and attached to wheel and tire assembly 62a. On large heavy duty trucks or tractors, the axles can be adjusted to be perpendicular to the major axis, that axis parallel to the frame centerline, of the vehicle as depicted by arrow 64. Perpendicularity between the axle and the major axis of the vehicle, or the frame centerline, eliminates angular thrust that causes undesirable vehicle dynamics. With the rear axle perpendicular to the frame, and aligned with the straight ahead adjustment of the steerable wheels, tire wear from misalignment is minimized and fuel economy is maximized.

The alignment of the rear axle is accomplished by retaining the setting in the head 12 that was used to establish the vehicle frame centerline or major axis prior to performing the "front end" alignment. If the front axle was not aligned then the ring laser gyro head 12 will be indexed to the centerline of the vehicle as was disclosed earlier.

The head 12 is then attached to one of the wheel and tire assemblies on the first axle such as axle 66. The ring laser gyro head 12 will then be cycled to read the axle thrust angle. The thrust angle should read as close to zero degrees as possible thus indicating that the rear drive axle 66 is perpendicular to the vehicle center line or the major axis of the vehicle. With the thrust angle of the first axle measured and adjusted, the head 12 (identified as 12' to indicate that it is the same unit, head 12, moved to a second location, 12'). The head 12' is removed from the first drive axle and moved and mounted to a wheel and tire assembly 62b on the rear axle 70. Thrust angle of axle 70 will then be adjusted, by moving the axle forward or back as indicated by arrow 72, such that the thrust angle is parallel to the vehicle centerline, parallel to the thrust angle of the first drive axle and parallel to the straight ahead position of the steering axle or axles. Ideally, after a good alignment job, the two drive axles of the truck chassis, will drive straight and aligned with the track frame, and the two steering axles will also drive straight down the road, perhaps with a small amount of toe in or toe out to make driving the vehicle easier, without any undesirable tire scrub due to camber or caster being out of specification.

Trailers, particularly those pulled behind tractors described immediately above, also benefit from being properly aligned. This entails setting both of the axles as close as possible to having them parallel to each other and perpendicular to the centerline of the trailer. The idea here is to dial out any thrust angle from the rear axle set of the trailer. Adjustment of thrust angle of the axles of a trailer, such as a semi-trailer, is accomplished in the same way that the rear axle of the tractor was adjusted except that the major axis of the trailer is established by selecting the frame centerline of the trailer or a virtual centerline for the trailer to which the ring laser gyro of the head 12 is indexed. With the center line established the head 12 is attached to one of the rear wheel and tire assemblies and alignment is carried out as above for the drive axles of the tractor. The wheel and tire assemblies of heavy duty trucks and trailers are often bent, mismounted, or otherwise do not present accurate vertical planes parallel to the major axis of the truck or trailer. In such cases it is possible to determine wheel misalignment or run out using the ring laser gyro head 12. The head 12 would be mounted to the suspect wheel, the wheel then rotated and as it rotates the misalignment relative to the major axis, a vertical plane, of a fixed point, can be determined. This step of checking wheel and tire assembly run out before proceeding with the alignment is a wise procedure. Wheel run out would be fixed before proceeding with the axle alignment of the non-steerable axles of trucks and trailers, and for that matter, of any vehicle.

Trucks, trailers and buses that have two (or more) sets of axles sometimes have an alignment problem where one axle is offset from the other and one or both of the axles are not laterally centered on the vehicle centerline, assuming that is a desirable deployment. Such offset is measured by the ring laser gyro head 12 as the angle between the mounted head 12 on the wheel and the pre-indexed vehicle frame centerline. Any angle other than zero degrees, indicating a plane parallel to the frame centerline, will indicate a problem. The solution is to move the out of specification axle inboard or outboard relative to the vehicle centerline until the measured angle at the ring laser gyro head 12 is zero degrees.

Race cars require frequent alignment adjustments. Furthermore, custom race cars may not have chassis construction control points available to the race car mechanic. For vehicles that don't have published chassis construction control points the vehicle or frame centerline the gyroscope will be referenced to an area that represents the vehicle centerline such as a stock car frame rail. It will be from this frame centerline that alignment measurements are taken. Alignment of a race car is similar to alignment of a production car although less compromise is "dialed" into the settings used on the race car.

It should be pointed out that that invention presented here is a device that incorporates a ring laser gyro, or a FOG, to determine various angles of a suspension system, it is not a disclosure of how to adjust alignment or perform an "alignment job" on a vehicle other than to disclose the use of a ring laser gyro, or FOG, for measuring various angles, such as toe angle, camber angle and caster angle.

In this application various measurements are measured, recorded and output in degrees, and fraction of degrees measured in minutes and seconds. It is easy to convert the degree measurements into linear measurement such as inches or metric measurements. For instance, toe angle is often expressed as a fractional inch measurement, such as "This car has a sixteenth of an inch of toe in." Toe is usually expressed in inches if done in the field, such as at a race track, and in degrees if done in an alignment shop. Camber is usually expressed as degrees. Caster is also expressed as degrees.

The Abstract presented is provided to enable classification personnel of the United States Patent and Trademark Office to quickly determine the nature of the technical disclosure presented in this write-up so that it is properly classified. The Abstract will also assist the public in determining the general technological area addressed. Thus, the Abstract is not intended to define the invention or to limit the scope of the invention in any way. The claims provided, however, are intended to encompass the invention to the fullest extent allowable. Each variation of the invention is limited only by the recited limitations of its respective claim, and equivalents thereof, without limitation by other terms not present in the claim. Likewise, the use of the words "function" or "means" in the disclosure is not intended to indicate a desire to invoke the special provisions of 35 U.S.C. 112, Paragraph 6, to define the invention. To the contrary, if the provisions of 35 U.S.C. 112, Paragraph 6 are sought to be invoked to define the inventions, the claims will specifically state the phrases "means for" or "step for" and a function, without also reciting in such phrases any structure, material or act in support of the function. Even when the claims recite a "means for" or "step for" performing a function, if they also recite any structure, material or acts in support of that means or step, then the intention is not to invoke the provisions of 35 U.S.C. 112, Paragraph 6. Moreover, even if the provisions of 35 U.S.C. 112, Paragraph 6 are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, material or acts for performing the claimed function.

What is claimed is:

1. An alignment system for measuring alignment of a structure, the alignment system comprising:
    a gyroscope carried in a housing, the gyroscope having an internal data storage location in an internal electronics package and the electronics package having data output capability;
    a digital x-axis inclinometer supported by the housing, the x-axis inclinometer having capability of directing data to the internal data storage location of the internal electronics package of the gyroscope, the x-axis inclinometer also having data output capability;
    a digital y-axis inclinometer supported by the housing, the y-axis inclinometer having capability of directing data to the internal data storage location of the gyroscope, the y-axis inclinometer also having data output capability;
    a central processing unit in communication with the gyroscope, the x-axis inclinometer, and the y-axis inclinometer, the central processing unit capable of receiving data from the laser gyroscope, the x-axis inclinometer and the y-axis inclinometer and for transmitting data; and
    an operator interface capable of sending and receiving data to and from the central processing unit;
    a data file pertaining to the structure, the data file stored in a location remote from the central processing unit and accessible through the operator interface, the central processing unit and a connection between the central processing unit and a data storage location at the remote location.

2. The invention in accordance with claim 1 wherein the gyroscope is a ring laser sensor.

3. The invention in accordance with claim 2 wherein the ring laser sensor comprises a laser block assembly based on a triangular leg path length.

4. The invention in accordance with claim 3 wherein the laser block assembly further comprises an equilateral glass ceramic block.

5. The invention in accordance with claim 4 wherein the laser gyroscope further comprises an internal electronics package.

6. The invention in accordance with claim 1 wherein the gyroscope comprises a compact single interferometric fiber-optic gyroscope carried in a compact enclosure.

7. The invention in accordance with claim 6 further comprising a processor-based electronics package.

8. The invention in accordance with claim 1 further comprising a radio communications network comprising a radio communications transceiver in the housing, a radio communications transceiver associated with the central processing unit, and a radio communications transceiver associated with the operator interface.

9. The invention in accordance with claim 8 wherein the operator interface comprises a monitor.

10. The invention in accordance with claim 9 wherein the monitor is a touch responsive screen monitor.

11. The invention in accordance with claim 8 wherein the operator interface comprises a headset having an audio speaker.

12. The invention in accordance with claim 11 wherein the headset comprises a microphone.

13. The invention in accordance with claim 8 wherein the laser gyroscope housing is carried by an alignment head mount, the alignment head mount capable of interfacing with a structure of which alignment is being measured.

14. The invention in accordance with claim 13 wherein the structure being measured is a wheel assembly of a vehicle and the alignment head mount is positioned to interface with the wheel assembly.

15. The invention in accordance with claim 13 wherein the structure is a control surface of an aircraft.

16. The invention in accordance with claim 15 wherein the control surface is the tail assembly of the aircraft.

17. The invention in accordance with claim 15 wherein the control surface is an aileron of the aircraft.

18. The Invention in accordance with claim 13 wherein the structure is a structural component of a building.

19. The invention in accordance with claim 13 wherein the structure is a pattern for the manufacture of a product.

20. A method of performing an alignment operation on a structure, the method comprising the acts of:
    a) positioning an alignment apparatus on the structure at a first location,
        i. the alignment apparatus comprising a gyroscope carried in a housing, the gyroscope further comprising an internal data storage location of an internal electronics package, the internal electronics package having data output capability;
        ii. a digital x-axis inclinometer supported by the housing, the x-axis inclinometer having capability of directing data to the internal data storage location of the internal electronics package of the gyroscope, the x-axis inclinometer also having data output capability;
        iii. a digital y-axis inclinometer supported by the housing, the y-axis inclinometer having capability of directing data to the internal data storage location of the gyroscope, the y-axis inclinometer also having data output capability;

iv. a central processing unit in communication with the gyroscope, the x-axis inclinometer, and the y-axis inclinometer, the central processing unit capable of receiving data from the gyroscope, the x-axis inclinometer and the y-axis inclinometer and for transmitting data;

v. an operator interface capable of sending and receiving data to and from the central processing unit;

b) sensing positional information pertaining to the first location;

c) repositioning the alignment apparatus at a second location on the structure;

d) sensing positional information of the second location on the structure;

e) comparing the positional information of the second location with predetermined positional data for the second location;

f) outputting information directing a procedure to conform the positional information of the second location with the predetermined positional data forte second location.

21. The method of performing an alignment operation in accordance with claim 20 wherein the alignment operation is a alignment operation to be performed on an automotive vehicle.

22. The method of claim 21 wherein the vehicle is an automobile and the alignment operation is performed on a steerable wheel of the vehicle, the steerable wheel corresponding to the second location on the structure, and in which the first location is a known location on the vehicle used as a benchmark data location to which alignment positional information for the automobile, including the specified positional information of the second location, is indexed.

23. The method of claim 21 further comprising a third location on the vehicle, the third location corresponding to the location of a second steerable wheel on the vehicle, the act further including the act of performing the alignment operation on the second steerable wheel of the vehicle, the second steerable wheel corresponding to the third location on the vehicle.

24. The method of claim 23 wherein the act of performing the alignment operation further comprises the act of:

adjusting camber of the first and the second steerable wheels of the vehicle to comport with the positional information for each wheel.

25. The method of claim 24 wherein the act of performing the alignment operation further comprises the act of:

adjusting toe angle of the first and second steerable wheels of the vehicle to comport with the positional information for each wheel.

26. The method of claim 25 further comprising a fourth location on the vehicle, the fourth location corresponding to the location of nonsteerable wheels on the vehicle, the act further including the act of performing the alignment operation on the nonsteerable wheel of the vehicle, the alignment operation further comprising the act of adjusting toe angle of the nonsteerable wheel.

27. The method of claim 25 further comprising a fourth location on the vehicle, the fourth location corresponding to the location of a second set steerable wheels on the vehicle, the act further including the act of performing the alignment operation on the second set of steerable wheel of the vehicle, the alignment operation further comprising the act of adjusting camber and toe angle of the second set steerable wheels.

28. The method of claim 25 further comprising a fourth location on the vehicle, the fourth location corresponding to the location of nonsteerable wheels on the vehicle, the act further including the act of performing the alignment operation on the nonsteerable wheel of the vehicle, the alignment operation further comprising the act of adjusting thrust angle of the nonsteerable wheels.

29. The method of performing an alignment operation in accordance with claim 20 wherein the alignment operation is an alignment operation to be performed on an aircraft.

30. The method of performing an alignment operation in accordance with claim 29 wherein the alignment operation is an alignment operation to be performed on a tail structure of the aircraft.

31. The method of performing an alignment operation in accordance with claim 29 wherein the alignment operation is an alignment operation to be performed on a control surface of an aircraft.

32. The method of performing an alignment operation in accordance with claim 20 wherein the alignment operation is an alignment operation to be performed on a building structure.

* * * * *